United States Patent
Schall et al.

(10) Patent No.: US 11,821,049 B2
(45) Date of Patent: Nov. 21, 2023

(54) FERRITIC STEEL FOR TURBOCHARGERS

(71) Applicant: BorgWarner Inc., Auburn Hills, MI (US)

(72) Inventors: Gerald Schall, Bobenheim-Roxheim (DE); Ingo Dietrich, Gruenstadt (DE); Volker Paul, Neustadt (DE); Nico Kanoffsky, Bolanden (DE)

(73) Assignee: BorgWarner Inc., Auburn Hills, MI (US)

( * ) Notice: Subject to any disclaimer, the term of this patent is extended or adjusted under 35 U.S.C. 154(b) by 224 days.

(21) Appl. No.: 16/320,742

(22) PCT Filed: Jul. 28, 2017

(86) PCT No.: PCT/US2017/044275
§ 371 (c)(1),
(2) Date: Jan. 25, 2019

(87) PCT Pub. No.: WO2018/022950
PCT Pub. Date: Feb. 1, 2018

(65) Prior Publication Data
US 2019/0153557 A1 May 23, 2019

(30) Foreign Application Priority Data

Jul. 28, 2016 (EP) .................................... 16181592
Mar. 8, 2017 (EP) .................................... 17159781

(51) Int. Cl.
| | | |
|---|---|---|
| C21D 6/02 | (2006.01) | |
| C21D 6/00 | (2006.01) | |
| C22C 38/46 | (2006.01) | |
| C22C 38/48 | (2006.01) | |
| C22C 38/50 | (2006.01) | |
| C22C 38/58 | (2006.01) | |
| C22C 38/02 | (2006.01) | |
| C22C 38/60 | (2006.01) | |
| C22C 38/00 | (2006.01) | |
| C22C 38/34 | (2006.01) | |
| F02C 6/12 | (2006.01) | |

(52) U.S. Cl.
CPC ............ *C21D 6/008* (2013.01); *C21D 6/004* (2013.01); *C21D 6/005* (2013.01); *C21D 6/02* (2013.01); *C22C 38/002* (2013.01); *C22C 38/02* (2013.01); *C22C 38/34* (2013.01); *C22C 38/46* (2013.01); *C22C 38/48* (2013.01); *C22C 38/50* (2013.01); *C22C 38/58* (2013.01); *C22C 38/60* (2013.01); *F02C 6/12* (2013.01); *C21D 2211/004* (2013.01); *C21D 2211/005* (2013.01); *F05D 2220/40* (2013.01); *F05D 2240/14* (2013.01); *F05D 2300/171* (2013.01); *F05D 2300/701* (2013.01)

(58) Field of Classification Search
CPC .. C21D 2211/005; C21D 6/004; C21D 6/005; C21D 6/008; C21D 6/02; C22C 38/34; F02C 6/12; F05D 2220/40; F05D 2240/14; F05D 2300/171; F05D 2300/701
USPC ........................................................ 148/325
See application file for complete search history.

(56) References Cited

U.S. PATENT DOCUMENTS

| | | | |
|---|---|---|---|
| 5,601,411 A | 2/1997 | Kenichi et al. | |
| 7,914,732 B2 * | 3/2011 | Takabayashi | ........... F01N 13/16 420/69 |
| 2007/0215252 A1 * | 9/2007 | Takabayashi | ........... C22C 38/24 148/325 |
| 2011/0132499 A1 | 6/2011 | Yamanaka et al. | |
| 2013/0160905 A1 * | 6/2013 | Sachadel | ................. C22C 38/52 148/621 |
| 2014/0086755 A1 | 3/2014 | Schall et al. | |
| 2016/0153312 A1 | 6/2016 | Shin | |

FOREIGN PATENT DOCUMENTS

| | | |
|---|---|---|
| CN | 102301029 A | 12/2011 |
| CN | 104060191 A | 9/2014 |
| JP | 2000204946 A | 7/2000 |
| JP | 2010255055 A | 11/2010 |
| JP | 2014523501 A | 9/2014 |

OTHER PUBLICATIONS

Written Opinion and International Search Report in International Application No. PCT/US2017/044275, dated Oct. 17, 2017.
Chinese Office Action dated Jul. 1, 2020, in Chinese Application No. 201780046746.8.
European Office Action dated Apr. 29, 2020, in European Application No. 17746359.3.
Second Chinese Office Action (with English language translation) dated Mar. 8, 2021, in Chinese Application No. 201780046746.8.
European Office Action dated Jan. 18, 2021, in European Application No. 17746359.3.
Japanese Office Action (with English language translation) dated Apr. 28, 2021, in Japanese Application No. 2019-504842.

* cited by examiner

*Primary Examiner* — Jie Yang
(74) *Attorney, Agent, or Firm* — Eric L. Doyle; Stephan A. Pendorf; Patent Central LLC

(57) ABSTRACT

A waste gate component for a turbo charger made of a ferritic steel including C, Cr, Ni, Nb, V, Mn, and optionally Si, and Ti as main alloying elements.

14 Claims, No Drawings

FERRITIC STEEL FOR TURBOCHARGERS

FIELD OF THE INVENTION

The present invention relates to the field of turbochargers, in particular turbochargers for use in internal combustion engines, specifically for diesel engines.

BACKGROUND OF THE INVENTION

Turbochargers are used to increase combustion air throughput and density, thereby increasing power and efficiency of internal combustion engines. The design and function of turbochargers are described in detail in the prior art, for example, U.S. Pat. Nos. 4,705,463, and 5,399,064, the disclosures of which are incorporated herein by reference.

The materials used in the production of turbochargers have to meet stringent performance requirements. For instance, the materials used in diesel engines have to be sufficiently corrosion resistant when exposed to exhaust gasses at temperatures of up to about 950° C. Furthermore, the materials have to satisfy demanding mechanical requirements at these high temperatures. For instance, in case of turbine housings, the thermomechanical fatigue (TMF) performance of the housing is an important performance criterium. Crack formation due to TMF is one of the most common failure modes of turbine housings. For these reasons, austenitic steels are used for diesel engine turbine housings, for instance GJS NiCrSi 35 5 2 NiResist D5 for exhaust gas temperatures of up to 950° C. (Diesel engines) and Inconel 713C for exhaust gas temperatures of up to 1050° C. (Otto engines). However, these materials are expensive due to the high amount of nickel necessary for obtaining an austenitic phase.

It would be desirable to design wastegate components in which the above-mentioned austenitic steels are replaced with a ferritic steel having a lower proportion of nickel while retaining at least similar performance. In particular, high temperature strength, TMF performance, corrosion resistance, and high temperature creep resistance of the wastegate component should be similar.

Attempts have been made in the prior art to provide high temperature resistant ferritic steels for turbochargers. DE 10 2012 100 289 A1 discloses ferritic steels comprising i.a. Si, Cr, Ni, Nb, V, and Mn. The disclosed alloys have a very low carbon content of 0.003 to 0.05 wt.-% and a very low nitrogen content of 0.0006 to 0.026 wt.-% to promote the formation of Laves phases ($Fe_2Nb$) over NbC precipitation. DE 10 2012 100 289 A1 discloses that the Laves phases may improve high temperature strength but, at the same time, that it is difficult to stabilize the Laves phase above 800° C. DE 10 2012 100 289 A1 also suggests adding Si to stabilize the Laves phase but also emphasizes that the amount should not exceed 0.9 wt.-% since higher amounts facilitate the undesirable precipitation of laves phases. However, silicon is an important element for processability reasons and for imparting corrosion resistance to the alloy. Thus, amounts exceeding 0.9 wt.-% may often be beneficial to the alloy. In conclusion, the concept of utilizing Laves phases for obtaining high temperature resistant ferritic steels for turbochargers is difficult to implement in practice and has practical limitations.

Given the above deficiencies, in commercial settings, turbo charger components which are supposed to be able to withstand temperatures of about 950° C. are still made of expensive austenitic cast iron or steels.

It would be desirable to have a robust and reliable high temperature resistant ferritic steel for turbochargers.

SUMMARY OF THE INVENTION

It has now been surprisingly found that carbon-containing ferritic steels may be improved in their high temperature performance, in particular their high temperature creep resistance, if the content of Nb, V, and Mn is adequately adjusted. More specifically, an alloy containing about 0.2 to about 1.0 wt.-% Nb, about 0.2 to about 1.0 wt.-% V, and about 1.0 to about 4.0 wt.-% Mn, can be expected to have improved high temperature creep resistance if the combined amount of Nb and V is sufficiently high and if Mn is used in specific substantial excess to Nb and V. The improved creep resistance can be realized without compromising on other properties such as TMF performance, corrosion resistance, or processability.

Without wishing to be bound by theory, it is believed that the rather high amounts of the carbide forming elements V and Nb reduce, in combination, the primary grain size as well as the size of the carbide precipitates. Smaller carbide particles close to the grain boundaries are a major obstacle to the migration of the sub-grain boundaries and the gliding of mobile dislocations, and therefore make an important contribution to high temperature creep strength. It was surprisingly found that Mn, which is commonly added to the alloy as deoxidizing agent, appears to cooperate in this mechanism to synergistically further increase high temperature creep strength. Without wishing to be bound by theory, it is believed that Mn, which is also a carbide stabilizer, is helping in controlling carbide particle size, in particular carbide particle size growth during thermal aging.

In one aspect, the present invention relates to turbo charger component, in particular a turbine housing, comprising a ferritic steel of the following composition:

C about 0.1 to about 0.8 wt.-%,
Cr about 15.0 to about 23.0 wt.-%,
Ni about 1.5 to about 3.0 wt.-%,
Nb about 0.2 to about 1.0 wt.-%, and
V about 0.2 to about 1.0 wt.-%;
Mn about 1.0 to about 4.0 wt.-%;
wherein combined amount of Nb and V is at least about 0.40 wt.-% and wherein the weight ratio of Mn to the total amount of Nb and V to is at least about 1.6;
optionally one or more of the following elements:
Si about 0.5 to about 1.8 wt.-%,
Ti about 0.1 to about 1.1 wt.-%; optionally other elements in a total amount of less than about 3 wt.-% (impurities); and
Fe as balance.

In another aspect, the present invention relates to a method for preparing a turbo charger component, in particular a turbine housing, said housing comprising a ferritic steel of the following composition:

C about 0.1 to about 0.8 wt.-%,
Cr about 15.0 to about 23.0 wt.-%,
Ni about 1.5 to about 3.0 wt.-%,
Nb about 0.2 to about 1.0 wt.-%, and
V about 0.2 to about 1.0 wt.-%;
Mn about 1.0 to about 4.0 wt.-%;
wherein combined amount of Nb and V is at least about 0.40 wt.-% and wherein the weight ratio of Mn to the total amount of Nb and V to is at least about 1.6;
optionally one or more of the following elements:
Si about 0.5 to about 1.8 wt.-%,
Ti about 0.1 to about 1.1 wt.-%;

optionally other elements in a total amount of less than about 3 wt.-% (impurities); and Fe as balance;

wherein the steel is subjected to a heat treatment, in particular thermal aging at about 900 to about 940° C. for at least about 1 hour, followed by cooling at a rate of at least about 40° C. and up to about 90° C./h.

DETAILED DESCRIPTION OF THE INVENTION

In a first aspect, the present invention relates to turbo charger component, in particular a turbine housing, comprising a ferritic steel of the following composition:

C about 0.1 to about 0.8 wt.-%,
Cr about 15.0 to about 23.0 wt.-%,
Ni about 1.5 to about 3.0 wt.-%,
Nb about 0.2 to about 1.0 wt.-%, and
V about 0.2 to about 1.0 wt.-%;
Mn about 1.0 to about 4.0 wt.-%;
wherein combined amount of Nb and V is at least about 0.40 wt.-% and wherein the weight ratio of Mn to the total amount of Nb and V to is at least about 1.6;
optionally one or more of the following elements:
Si about 0.5 to about 1.8 wt.-%,
Ti about 0.1 to about 1.1 wt.-%;
optionally other elements in a total amount of less than about 3 wt.-% (impurities); and
Fe as balance.

As discussed above, the elements V and Nb influence the microstructure of the alloy. The ferritic steel may advantageously be characterized by a microstructure having an average grain size of between about 2 and about 4, in particular between about 2.5 and about 3.5, measured according to ASTM E112-12. ASTM E112-12 covers procedures for determining the average grain size of all metals and, in particular, discloses a procedure to determine the average grain size of ferritic steels in item 4.1.1 and table 1.

The above ferritic steels having excellent TMF performance, creep strength, and corrosion resistance may advantageously be preparable by heat treatment such as thermal aging, in particular according to the method of the second aspect of the invention.

In a second aspect, the present invention relates to a method for preparing a turbo charger component, in particular a turbine housing, said component comprising a ferritic steel of the following composition:

C about 0.1 to about 0.8 wt.-%,
Cr about 15.0 to about 23.0 wt.-%,
Ni about 1.5 to about 3.0 wt.-%,
Nb about 0.2 to about 1.0 wt.-%, and
V about 0.2 to about 1.0 wt.-%;
Mn about 1.0 to about 4.0 wt.-%;
wherein combined amount of Nb and V is at least about 0.40 wt.-% and wherein the weight ratio of Mn to the total amount of Nb and V to is at least about 1.6;
optionally one or more of the following elements:
Si about 0.5 to about 1.8 wt.-%,
Ti about 0.1 to about 1.1 wt.-%;
optionally other elements in a total amount of less than about 3 wt.-% (impurities); and Fe as balance;
wherein the steel is subjected to a heat treatment, in particular thermal aging at about 900 to about 940° C. for at least about 1 hour, followed by cooling at a rate of at least about 40° C. and up to about 90° C./h.

When referring to "ferritic steel", it should be understood that the alloy may also contain other phases, for instance the austenitic phase, in various proportions.

The thermal aging facilitates the precipitation of secondary phases and may further increase the strength, creep resistance and TMF performance of the ferritic steel. Advantageously, the ferritic steel is subjected to thermal aging at about 910 to about 930° C. for about 2 to about 5, in particular about 3 to about 4 hours. Advantageously, the thermal aging is followed by cooling at a rate of between about 50° C./h to about 80° C./h, in particular about 60° C./h to about 70° C./h, to a temperature of between about 450 and about 550° C., in particular between about 475 and 525° C., followed by cooling to ambient temperature.

Advantageously, the ferritic steel contains the following elements in the following amounts:

C about 0.1 to about 0.8 wt.-%,
Cr about 15.0 to about 23.0 wt.-%,
Ni about 1.5 to about 3.0 wt.-%,
Nb about 0.2 to about 0.8 wt.-%,
V about 0.2 to about 0.8 wt.-%,
Si about 0.5 to about 1.8 wt.-%, and
Mn about 1.6 to about 4.0 wt.-%

Advantageously, the ferritic steel contains a total amount of Nb and V of at least about 0.45 wt.-%, in particular in the range of about 0.45 wt.-% to about 1.5 wt.-%, more specifically about 0.5 wt.-% to about 1.0 wt.-%. With a view of optimizing high temperature creep strength, the ferritic steel is characterized by a weight ratio of Mn to the total amount of Nb and V of at least about 1.8, in particular at least about 2.0. Alternatively, the weight ratio of Mn to the total amount of Nb and V is advantageously in the range of about 1.6 to about 10, in particular about 1.8 to about 8.0, more specifically about 2.0 to about 6.0, or about 2.5 to about 4.0.

Advantageously, the ferritic steel may contain about 0.2 to about 0.6 wt.-% Nb, in particular 0.25 to about 0.5 wt.-% Nb; and about 0.2 to about 0.8 wt.-% V, in particular about 0.25 to about 0.75 wt.-% V. Additionally or alternatively, the ferritic steel may advantageously contain a total amount of Nb and V of at least about 0.45 wt.-%, in particular in the range of about 0.45 wt.-% to about 1.5 wt.-%, more specifically about 0.5 wt.-% to about 1.0 wt.-%.

From a viewpoint of optimizing creep strength and corrosion properties of the ferritic steel, the ferritic steel may advantageously contain a total amount of Nb and V of at least about 0.45 wt.-%, in particular in the range of about 0.45 wt.-% to about 1.5 wt.-%, more specifically about 0.5 wt.-% to about 1.0 wt.-%; wherein the weight ratio of Mn to the total amount of Nb and V is at least about 1.8, in particular at least about 2.0; and about 0.5 to about 1.8 wt.-% Si, in particular about 0.8 to about 1.5 wt.-%.

From a viewpoint of further optimizing corrosion resistance, the ferritic steel may advantageously contain Cr in an amount of about 16.0 to about 20.0 wt. %, in particular about 17.0 to about 19.0 wt.-%.

From a viewpoint of optimizing castability of the alloy, the ferritic steel may contain Si as a viscosity-reducing agent in amounts of about 1.0 to about 1.8 wt.-%, in particular about 1.0 to about 1.5 wt.-%.

From a viewpoint of optimizing mechanical properties and corrosion resistance of the ferritic, the ferritic steel may advantageously contain a total amount of Nb and V of at least about 1.2 wt.-%, in particular at least about 1.4 wt.-%, or at least about 1.6 wt.-%, or at least about 1.8 wt.-%, and Si in amounts of about 1.0 to about 1.8 wt.-%, in particular about 1.0 to about 1.5 wt.-%. Additionally or alternatively, the ferritic steel may also have a weight ratio of V to Nb of between about 1.2 to about 10, in particular about 1.2 to about 5.

From a viewpoint of optimizing high temperature creep strength, TMF performance and corrosion resistance, the ferritic steel may advantageously contain the following elements in the following amounts:
C about 0.2 to about 0.5 wt.-%,
Cr about 17.0 to about 20.0 wt.-%,
Ni about 1.8 to about 2.5 wt.-%,
Nb about 0.2 to about 0.6 wt.-%,
V about 0.2 to about 0.8 wt.-%,
Si about 0.5 to about 1.8 wt.-%, and
Mn about 1.8 to about 2.8 wt.-%.

From a purity standpoint, in both the first and the second aspect of the invention, the ferritic steel advantageously may contain less than about 0.05 wt.-% P, in particular less than about 0.02 wt.-%, and/or less than about 0.2 wt.-% S, in particular less than about 0.16 wt.-%. Advantageously, the ferritic steel may also contain between about 0.01 to about 0.2 wt.-% S and between about 0 and 0.05 wt.-% P.

As was discussed above, it is believed that the rather high amounts of the carbide forming elements V and Nb reduce, in combination, the primary grain size as well as the size of the carbide precipitates and that Mn assists in controlling carbide particle size, in particular carbide particle size growth during thermal aging. This can be expected to improve high temperature creep strength since smaller carbide particles impede the migration of the sub-grain boundaries and the gliding of dislocations.

The improvement of high temperature creep strength was exemplified using the software JMatPro, obtainable from Sente Software Ltd., Guildford, UK. An overview of JMatPro for predicting properties in steels can i.a. be found in the article *Int. J. Microstructure and Materials Properties*, Vol. 4, No. 2, 2009, which is incorporated herein by reference. The creep strength at 870° C. for a representative alloy i.a. having contents of Fe, C, Cr, Ni, Nb, and V as defined above and varying contents of Mn was calculated and the results are shown below in the below table:

| Chemistry (wt.-%) | Content Austentite | Content Carbides | Weight Ratio Mn/ (Nb + V) | Creep Strength 100 MPa 870° C. [10/s] |
|---|---|---|---|---|
| 0.3 Nb 0.4 V | 65 | 5 | — | 0.0010 |
| 0.3 Nb 0.4 V 0.3 Mn | 65 | 5 | 0.42 | 0.0009 |
| 0.3 Nb 0.4 V 0.5 Mn | 70 | 5 | 0.71 | 0.0007 |
| 0.3 Nb 0.4 V 0.7 Mn | 70 | 5 | 1.0 | 0.0006 |
| 0.3 Nb 0.4 V 0.9 Mn | 72 | 5 | 1.28 | 0.0005 |
| 0.3 Nb 0.4 V 1.1 Mn | 75 | 5 | 1.57 | 0.0004 |
| 0.3 Nb 0.4 V 1.35 Mn | 75 | 5 | 1.92 | 0.0003 |

As can be seen from the above table, increasing the proportion of Mn in relation to the total amount of V and Nb increases creep strength. At a ratio of about 1.6 excellent creep strength is obtained. Moreover, also starting at a ratio of about 1.6, the austenite content stabilizes for the alloy system.

As can be seen from the above, the above described alloys can be expected to be highly suitable for turbocharger components, in particular turbine housings which are supposed to withstand high temperatures such as about 925° C.

The ferritic steels mentioned in this patent application can be prepared by routine methods well-known in metallurgy. Advantageously, the turbocharger components are melt cast, in particular in cases where the ferritic steel contains about 1.0 to about 1.8 wt.-%, and in particular about 0.8 to about 1.5 wt.-%, Si.

Advantageously, the wall thickness of the housing (measured at its thinnest point) is less than 5 mm, in particular less than the 4 mm, or less than 3 mm. The fine microstructure of the ferritic steels of the invention allows reducing the wall thickness to these levels without compromising on mechanical properties. A reduced wall thickness, in turn, is beneficial to reducing the time needed for the turbocharger component to reach operating temperatures. This may be beneficial in reducing the amount of harmful emissions of the engine prior to its reaching operating temperature.

Still further embodiments are within the scope of the following claims.

The invention claimed is:

1. A method for preparing a turbo charger component having a creep rate of 0.0003 or less (×10/s) under 100 MPa strength at temperature of 870° C., said component comprising a ferritic steel of the following composition:
C 0.1 to 0.8 wt.-%,
Cr 15.0 to 23.0 wt.-%,
Ni 1.5 to 3.0 wt.-%,
Nb 0.2 to 1.0 wt.-%,
V 0.2 to 1.0 wt.-%;
Mn 1.35 to 4.0 wt-%;
wherein the weight ratio of Mn to the total amount of Nb and V is at least 1.6;
other elements in a total amount of less than 3 wt.-% (impurities); and
Fe as balance;
wherein the steel is subjected, to a heat treatment at 900 to 940° C. for at least 1 hour, followed by cooling at a rate of at least 40° C. and up to 90° C./h.

2. The method for preparing a turbocharger component according to claim 1, wherein the ferritic steel is characterized by a microstructure having an average grain size of between 2 and 4, measured according to ASTM E112-12.

3. The method for preparing a turbocharger component according to claim 1, wherein the ferritic steel contains the following elements in the following amounts:
C 0.1 to 0.8 wt.-%,
Cr 15.0 to 23.0 wt.-%,
Ni 1.5 to 3.0 wt.-%,
Nb 0.2 to 0.8 wt.-%,
V 0.2 to 0.8 wt.-%,
Si 0.5 to 1.8 wt.-%, and
Mn 1.6 to 4.0 wt.-%.

4. The method for preparing a turbocharger component according to claim 1, wherein the terrific steel contains one or more of the following elements:
Si 0.5 to 1.8 wt.-%, and
Ti 0.1 to 1.1 wt.-%.

5. The method for preparing a turbocharger component according to claim 1, wherein the ferritic Steel is characterized by a weight ratio of Mn to the total amount of Nb and V of at least 1.8.

6. The method for preparing a turbocharger component according to claim 1, wherein the terrific steel contains 0.2 to 0.6 wt-% Nb and 0.2 to 0.8 wt.-% V.

7. The method for preparing a turbocharger component according to claim 1, wherein the terrific steel contains the following elements in the following amounts:
C 0.2 to 0.5 wt.-%,
Cr 17.0 to 20.0 wt.-%,
Ni 1.8 to 2.5 wt.-%,
Nb 02 to 0.6 wt.-%, V 0.2 to 0.8 wt.-%,
Si 0.5 to 1.8 wt.-%, and
Mn 1.8 to 2.8 wt.-%.

8. The method for preparing a turbocharger component according to claim 1, wherein the ferritic steel contains less than 0.05 wt-% P, and/or less than wt.-% S.

9. The method according to claim 1, wherein the ferritic steel is melt cast and contains 1.0 to 1.8 wt.-% Si.

10. The method for preparing a turbocharger component according to claim 1, wherein the steel is subjected to thermal aging at 910 to 930° C. for 2 to 6 hours, followed by cooling at a rate of between 50° C./h to 80° C./h to a temperature of between 450 and 550° C., followed by cooling to ambient temperature.

11. The method for preparing a turbocharger component according to claim 4, wherein said turbocharger component is a turbine housing.

12. The method for preparing a turbocharger component according to claim 1, wherein the ferritic steel is characterized by a microstructure having an average, grain size of between 2.5 and 3.5, measured according to ASTM E112-12.

13. The method for preparing a turbocharger component according to claim 1, wherein the steel is prepared by subjecting the ferritic steel to thermal aging at 910 to 930° C. for at least 2 hours, followed by cooling at a rate of between 50° C./h and 80° C./h.

14. The method for preparing a turbocharger component according to claim 1, wherein the ferritic steel contains a total amount of Nb and Vin the range of 0.45 wt-% to 1.5 wt.-%.

\* \* \* \* \*